United States Patent [19]

Newman et al.

[11] Patent Number: 5,946,654
[45] Date of Patent: Aug. 31, 1999

[54] SPEAKER IDENTIFICATION USING UNSUPERVISED SPEECH MODELS

[75] Inventors: Michael Jack Newman, Somerville; Laurence S. Gillick, Newton; Yoshiko Ito, Arlington, all of Mass.

[73] Assignee: Dragon Systems, Inc., Newton, Mass.

[21] Appl. No.: 08/804,061

[22] Filed: Feb. 21, 1997

[51] Int. Cl.⁶ .................... G10L 5/06; G10L 9/00
[52] U.S. Cl. .................. 704/246; 704/249; 704/250
[58] Field of Search .................. 704/246, 249, 704/250

[56] References Cited

U.S. PATENT DOCUMENTS

| | | | |
|---|---|---|---|
| 4,363,102 | 12/1982 | Holmgren et al. | 704/238 |
| 4,773,093 | 9/1988 | Higgins et al. | |
| 4,783,803 | 11/1988 | Baker et al. | 381/42 |
| 4,805,218 | 2/1989 | Bamberg et al. | 381/43 |
| 4,805,219 | 2/1989 | Baker et al. | 381/43 |
| 4,817,158 | 3/1989 | Picheny | 381/47 |
| 4,829,576 | 5/1989 | Porter | 381/43 |
| 4,833,712 | 5/1989 | Bahl et al. | 381/43 |
| 4,931,950 | 6/1990 | Isle et al. | 364/513 |
| 5,027,406 | 6/1991 | Roberts et al. | 381/43 |
| 5,036,538 | 7/1991 | Oken et al. | 381/43 |
| 5,095,508 | 3/1992 | Fujimoto | 704/247 |
| 5,202,952 | 4/1993 | Gillick et al. | 395/2 |
| 5,271,088 | 12/1993 | Bahler. | |
| 5,339,385 | 8/1994 | Higgens | 704/246 |
| 5,412,738 | 5/1995 | Brunelli et al. | 382/115 |
| 5,465,290 | 11/1995 | Hampton et al. | 379/88.02 |
| 5,497,373 | 3/1996 | Hulen et al. | 370/79 |
| 5,522,012 | 5/1996 | Mammone et al. | 704/250 |

OTHER PUBLICATIONS

Peskin et al., Topic and Speaker Identification via Large Vocabulary Continuous Speech Recognition, Human Language Technology, Proceedings of a Workshop held at Plainsboro, New Jersey, Mar. 21–24, 1993, pp. 119–124.

Gillick et al., Application of Large Vocabulary continuous Speech Recognition... Using Telephone Speech 1993 IEEE Int. Conf. on Acoustics, Speech, and Signal Processing Apr. 27–30, Minneapolis, MN pp. II–471–474.

Peskin et al., Improvements in Switchboard Recognition and Topic Identification, The 1996 IEEE Int. Conf. on Acoustics, Speech, and Signal Processing Conf. Proceedings, May 7–10, 1996 Atlanta, Georgia 1:303–306.

Gauvain, J.L. et al., "Experiments with Speaker Verification Over the Telephone," ESCA, Eurospeech '95, Madrid (Sep. 1995), pp. 651–654.

Mandel, Mark A. et al., "A Commercial Large–Vocabulary Discrete Speech Recognition System: DragonDictate," Language and Speech, vol. 35 (1,2) (1992), pp. 237–246.

Newman, Michael et al., "Speaker Verification Through Large Vocabulary Continuous Speech Recognition," Dragon Systems, Inc., Newton, MA.

Sadaoki Furui, Digital Speech Processing, Synthesis, and Recognition, pp. 243–244; 285–289, 1989.

Steve Young, Large Vocabulary Continuous Speech Recognition: a Review, IEEE Automatic Speech Recognition Workshop, pp. 3–10.

P.S. Gopalakrishnan et al, Models and Algorithms for Continuous Speech Recognition: A Brief Tutorial, Circuits and Systems, 1993 IEEE Midwest Symposium, pp. 1535–1538, 1993.

Primary Examiner—David R. Hudspeth
Assistant Examiner—Robert Louis Sax
Attorney, Agent, or Firm—Fish & Richardson P.C.

[57] ABSTRACT

A speech model is produced for use in determining whether a speaker associated with the speech model produced an unidentified speech sample. First a sample of speech of a particular speaker is obtained. Next, the contents of the sample of speech are identified using speech recognition. Finally, a speech model associated with the particular speaker is produced using the sample of speech and the identified contents thereof. The speech model is produced without using an external mechanism to monitor the accuracy with which the contents were identified.

29 Claims, 8 Drawing Sheets

Figure 7:
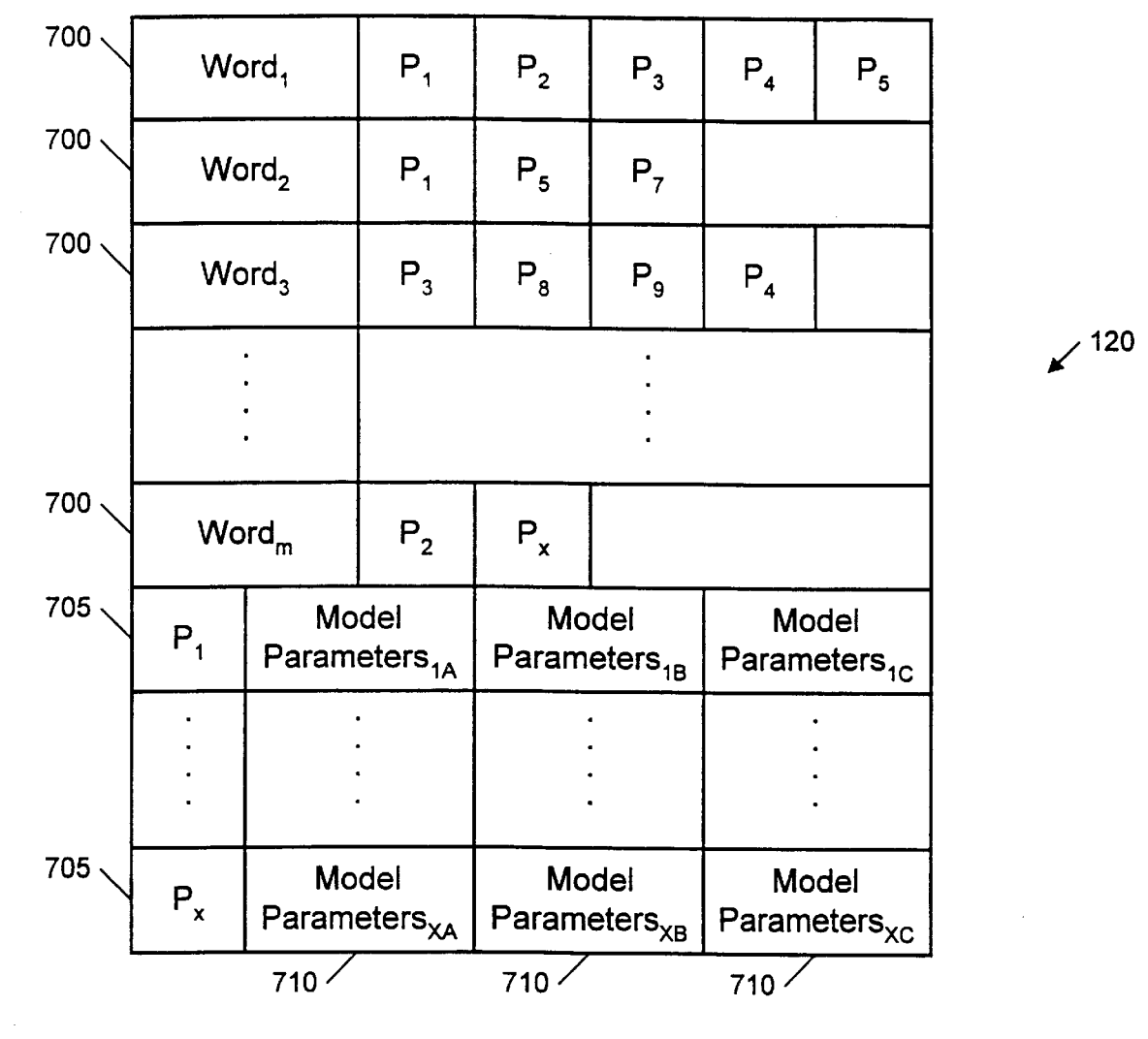

| 700 | Word$_1$ | P$_1$ | P$_2$ | P$_3$ | P$_4$ | P$_5$ |
|---|---|---|---|---|---|---|
| 700 | Word$_2$ | P$_1$ | P$_5$ | P$_7$ | | |
| 700 | Word$_3$ | P$_3$ | P$_8$ | P$_9$ | P$_4$ | |
| | ⋮ | | ⋮ | | ⋮ | |
| 700 | Word$_m$ | P$_2$ | P$_x$ | | | |
| 705 | P$_1$ | Model Parameters$_{1A}$ | Model Parameters$_{1B}$ | Model Parameters$_{1C}$ | | |
| | ⋮ | ⋮ | ⋮ | ⋮ | | |
| 705 | P$_x$ | Model Parameters$_{XA}$ | Model Parameters$_{XB}$ | Model Parameters$_{XC}$ | | |

SPEAKER IDENTIFICATION USING UNSUPERVISED SPEECH MODELS

STATEMENT AS TO FEDERALLY SPONSORED RESEARCH

The goverment may have certain rights in this invention.

BACKGROUND OF THE INVENTION

The invention relates to speaker identification.

Speaker identification systems identify a person by analyzing the person's speech. In general, there are three kinds of speaker identification: speaker verification, closed set identification, and open set identification.

A speaker verification system compares a sample of speech from a person who professes to be a particular known speaker to previous samples (or models) of speech of that known speaker to verify the identity of the speaker (by determining whether the sample matches the previous samples).

A closed set identification system analyzes a sample of speech in relation to the speech of each of a set of known speakers. The system then determines that the speech was produced by the known speaker whose speech most closely matches the sample of speech. Thus, a closed set identification system identifies the single known speaker who is mostly likely to have produced the sample of speech.

An open set identification system analyzes a sample of speech in relation to the speech of each of a set of known speakers. The system determines for each known speaker whether the sample of speech was likely to have come from that speaker. The system may determine that the sample of speech was likely to have come from multiple speakers.

In one approach to speaker identification, speech recognition is used to identify the words spoken by the person as the first step in the identification process. Speech recognition systems analyze a person's speech to determine what the person said. Typically, a processor divides a signal that represents the speech into a series of digital frames that each represent a small time increment of the speech. The processor then compares the digital frames to a set of speech models. Each speech model may represent a word from a vocabulary of words, and may represent how that word is spoken by a variety of speakers. A speech model also may represent a sound, or phoneme, that corresponds to a portion of a word. The processor determines what the person said by finding the speech models that correspond best to the digital frames that represent the person's speech. Speech recognition is discussed in U.S. Pat. No. 4,805,218, entitled "Method for Speech Analysis and Speech Recognition", which is incorporated by reference.

After using speech recognition to determine the content of the speech, the speaker identification system determines the source of the speech by comparing the recognized speech to stored samples of speech produced by different known speakers. The stored samples of speech may be produced, for example, by having a known speaker read from a list of words, or by having the known speaker respond to prompts that ask the speaker to recite certain words. As the known speaker reads from the list of words or responds to the prompts, the known speaker's speech is sampled and the samples are stored along with the identity of the known speaker.

SUMMARY OF THE INVENTION

In one aspect, generally, the invention features producing a speech model for use in determining whether a speaker associated with the speech model produced an unidentified speech sample. A sample of speech of a particular speaker is obtained, and the contents of the sample of speech are identified using speech recognition. A speech model associated with the particular speaker then is produced using the sample of speech and the identified contents thereof. The speech model is produced without using an external mechanism to monitor the accuracy with which the contents were identified. For example, the speaker is not prompted or required to read from a script, and an external mechanism, such as a human transcriber, is not used to verify the accuracy of the speech recognition process.

The invention's use of unsupervised training data permits a variety of application that are unsuitable for systems that require supervised training data. For example, the invention may be employed to produce models for use in identifying the sources of messages in a voice messaging system. As messages are processed by the system, the contents of the messages may be used to produce speech models for the speakers who produced the messages. These speech models may then be used to identify the sources of other messages.

Embodiments of the invention may include one or more of the following features. The speech recognition process by which the contents of the sample of speech are identified may include producing a time alignment that associates portions of the sample of speech with different sounds, and the speech model may be produced so that the speech model indicates how the particular speaker produces the different sounds based on the associated portions of the sample of speech.

The speech model may be produced by providing an unadapted speech model based on speech of a collection of speakers. Thereafter, portions of the unadapted speech model related to sounds included in the speech sample may be adapted based on the portions of the speech sample associated with those sounds. The unadapted speech model may be a monophone model that represents phonemes, rather than words. The model may represent each phoneme as a sequence of three nodes, and may represent each node using a collection of parameters that represent the frequency content of the node. By contrast, the speech recognition process may use a recognition vocabulary that includes triphone models. The unadapted speech model may be adapted using a Bayesian adaptation approach. A speaker identifier that identifies the particular speaker may be associated with the speech model.

A sample of speech may be obtained from an unidentified speaker and the contents of the sample may be identified using speech recognition. Based on the identified contents, the sample of speech may be compared to the speech model for the particular speaker to determine whether the particular speaker is likely to be the unidentified speaker. The comparison may include generating a comparison score for the speech model, and may also include generating a comparable comparison score for an unadapted speech model based on speech of a collection of speakers. A relative score may then be generated based on the difference between the comparison score for the speech model for the particular speaker and the comparison score for the unadapted speech model.

In some embodiments, the speech model may be modified using the second sample of speech and the identified contents thereof. In particular, this modification may take place when the particular speaker is likely to be the unidentified speaker.

In another aspect, generally, the invention features identifying a speaker who produced an unidentified speech sample by producing speech models for known speakers using the techniques discussed above, identifying the contents of the speech sample from the unidentified speaker using speech recognition, and comparing the speech sample, based on the identified contents, to the speech models for the known speakers to determine whether the unidentified speaker is likely to be a known speaker.

Embodiments of the invention may include one or more of the following features. In open set speaker identification, an indication that none of the known speakers are likely to be the unidentified speaker may be provided when none of the speech models for the known speakers closely match the sample of speech for the unidentified speaker. In closed set speaker identification, the unidentified speaker may be identified as the known speaker corresponding to the speech model that most closely matches the sample of speech for the unidentified speaker.

Other features and advantages will become apparent from the following description, including the drawings, and from the claims.

BRIEF DESCRIPTION OF THE DRAWING

FIGS. 5–8 are block diagrams of data structures of the speaker identification system of FIG. 1.

DESCRIPTION OF THE PREFERRED EMBODIMENTS

Figure 1:
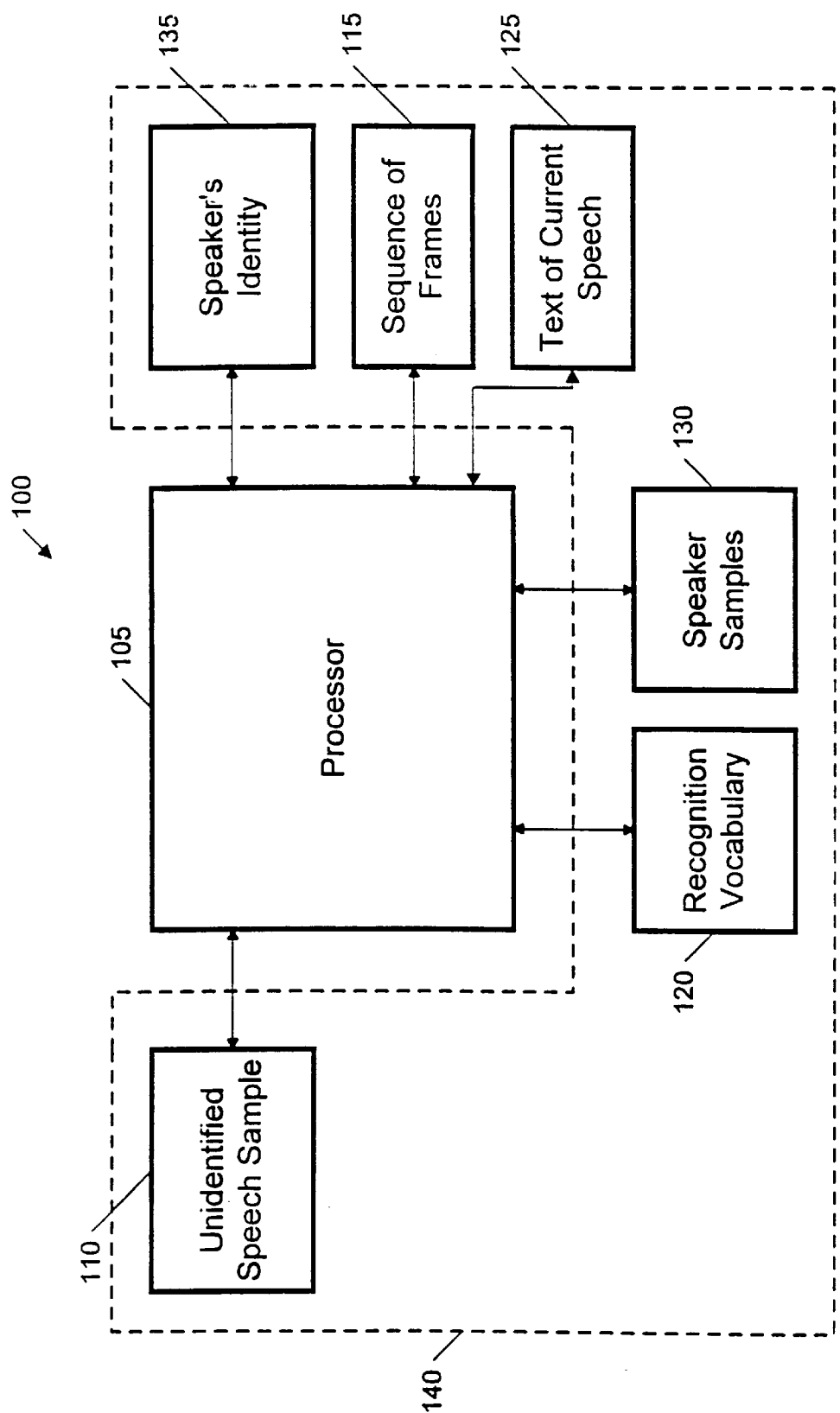
FIG. 1 is a block diagram of a speaker identification system.

Referring to FIG. 1, a speaker identification system 100 includes a processor 105 that performs speech recognition as a first step in identifying the speaker who produced an unidentified speech sample 110. The processor 105 analyzes the sample 110 to produce a sequence of frames 115 which represent the frequency content of the sample as it varies with time. Each frame represents a short portion (e.g., 20 milliseconds) of the sample 110.

The processor compares the sequence of frames 115 to acoustic models of words from a recognition vocabulary 120 to identify the text 125 that corresponds to the sample 110. The recognition vocabulary 120 represents words using a pronunciation model in which each word is represented by a series of phonemes, and each phoneme is represented by one or more nodes that correspond to the particular sounds that define the phoneme. For example, in one implementation, each phoneme includes three nodes. In making the comparison, the processor uses a dynamic programming technique to identify the series of words to which the sequence of frames 115 best corresponds. Using this technique, the processor produces a time alignment that relates each frame of the model 115 to a particular phoneme node.

The processor 105 uses the text 125 to compare the sequence of frames 115 to a set of speech models 130 produced from the speech of known speakers. Each speech model represents a known speaker's pronunciation of different phonemes. The processor compares each frame of the sequence of frames 115 to the model from the speech model of the phoneme node that corresponds to the frame, and produces a score for the speech model based on this comparison. The processor uses this score to determine whether the sample 110 is likely to have been produced by the known speaker who produced the speech corresponding to the speech model. The processor generates similar scores for all of the speech models. In a closed set identification system, the processor identifies as the speaker 135 who produced the speech corresponding to the sample 110 the known speaker who produced the speech corresponding to the best-scoring speech model. In an open set identification system, the processor produces, for each known speaker, an estimate of the probability that the speech corresponding to the sample 110 came from the speaker.

The unidentified speech sample 110, the sequence of frames 115, the recognition vocabulary 120, the text of the unidentified speech sample 125, the speech models 130 produced from the speech of known speakers, and the speaker's identity 135 may be stored in a storage device 140, such as a memory or a hard drive, associated with the processor 105.

Figure 2:
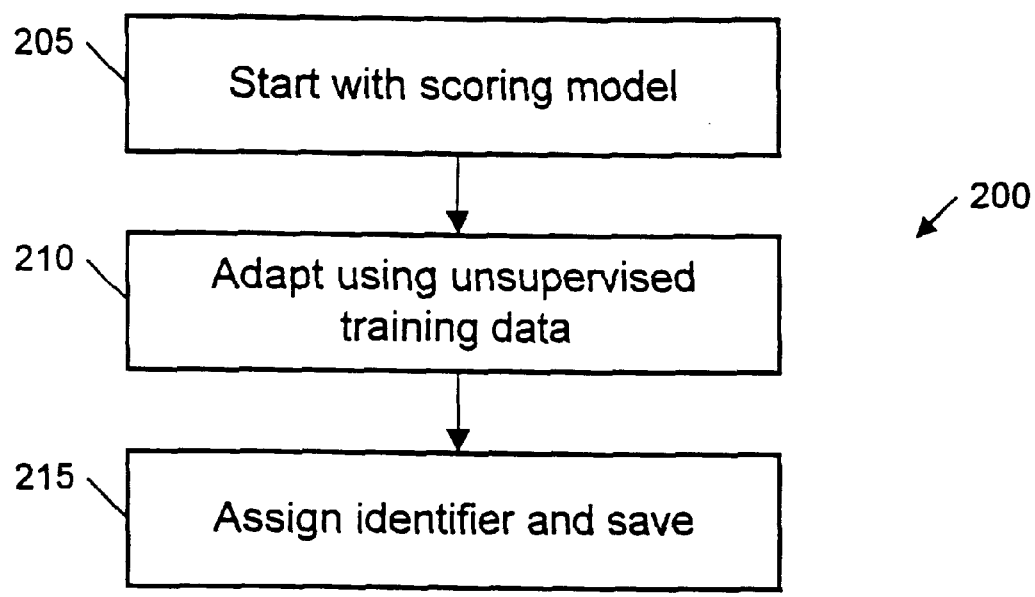
FIG. 2 is a flow chart of a procedure performed by the speaker identification system of FIG. 1.
Figure 3:
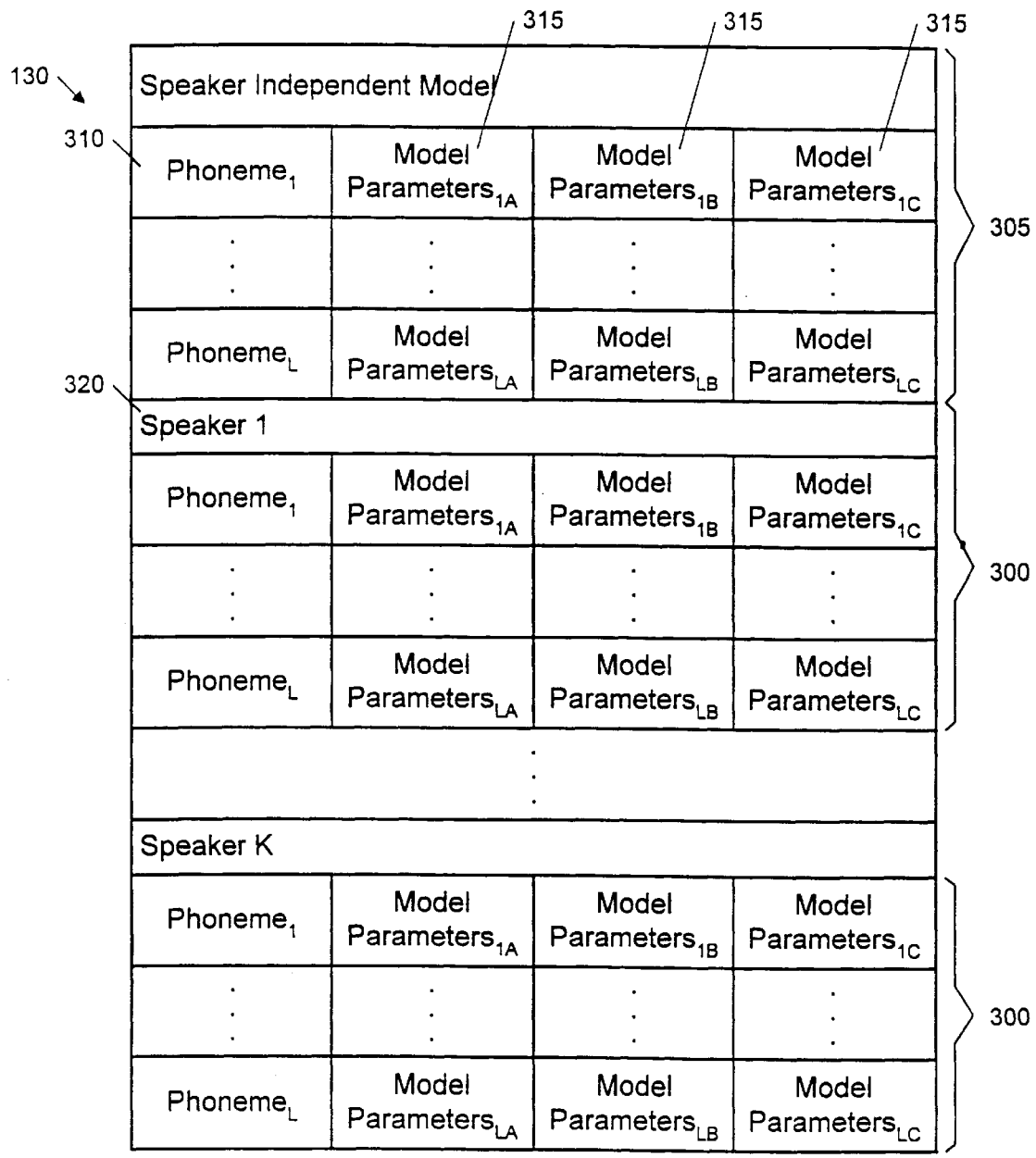
FIG. 3 is a block diagram of a data structure of the speaker identification system of FIG. 1.

Referring to FIGS. 2 and 3, the processor 105 produces a speech model 300 for a known speaker according to a procedure 200. The processor starts with a speaker independent model 305 (step 205), referred to as a scoring model, that may be adapted to the known speaker. In one implementation, the scoring model 305 is a monophone model, which means that the model represents each phoneme 310 independently of the context of other models. The monophone model may represent the English language as having 43 different phonemes. Since the scoring model 305 represents each phoneme 310 using three nodes, the scoring model includes 129 sets of parameters 315 (43 phonemes×3 sets of parameters per phoneme). By contrast, the recognition vocabulary 120 uses a triphone model that represents each phoneme in the context of the two adjacent phonemes. Since there are 43 phonemes, there are $43^3$ possible triphones. The recognition vocabulary, though not including every possible triphone, typically includes on the order of 20,000 sets of model parameters. Thus, a monophone scoring model 305 will be substantially smaller than the recognition vocabulary 120. In addition, the scoring model 305 permits comparison of a phoneme that appears in the model 115 of the unidentified speech sample 110 with a phoneme that is included in the scoring model 305, even when the phonemes appear in two different words in the two models. This permits speech to be analyzed without requiring a word-for-word word match between the speech and the training data used to produce the scoring model. For example, the phoneme corresponding to the "u" in the word "but" could be compared to the phoneme corresponding to the "u" in the word "cup". In some embodiments, a context dependent scoring model may be employed.

The scoring model 305 represents each phoneme node using parameters 315 that represent the frequency content typically associated with the phoneme node. Parameter types may include frequency parameters, cepstral parameters, and signals derived from the frequency parameters and cepstral parameters. Frequency parameters represent the content of the speech at each of a set of frequency bands and are generated using a fast fourier transform (FFT). Cepstral parameters are generated by performing a cosine transformation on logarithms of the frequency parameters. Cepstral parameters have been found to emphasize information important to speech recognition more effectively than frequency parameters. The processor may combine the cepstral parameters using an IMELDA linear discrimination transformation or similar techniques.

In one implementation, the scoring model 305 represents each phoneme node using forty four pairs of parameters. The parameters include eight pairs of spectral parameters, twelve pairs of cepstral parameters, twelve pairs of cepstral differences (i.e., the differences between cepstral parameters in successive frames) and twelve pairs of cepstral second differences (i.e., the differences between cepstral differences in successive frames). The first parameter of each pair represents the mean value of the parameter for different samples of the phoneme node. The second parameter of each pair represents the variance of the values of the parameter for different samples of the phoneme node. For recognition, the set of forty four pairs of parameters may be reduced to a set of twenty four pairs of parameters using an IMELDA transform.

The processor adapts the scoring model 305 to a particular known speaker using unsupervised training data associated with that speaker (step 210). Unsupervised training data is produced by using speech recognition techniques to determine what the speaker said and without using an external mechanism to verify that the recognition is accurate. For example, if the speaker identification system 100 were implemented as part of a voice messaging system, the processor would produce the unsupervised training data by recognizing the words in a message left by the speaker. By contrast, supervised training data is produced by requiring the known speaker to respond to prompts or to read from a predetermined script, by verifying the accuracy of the speech recognition and correcting any mistakes, or simply by manually transcribing the known speaker's speech.

The processor 105 adapts phoneme nodes of the scoring model 305 using a Bayesian adaptation approach. In particular, the processor 105 produces an adapted parameter $P_A$ for each parameter of the phoneme node as:

$$P_A = (R*P + N_S * P_S)/(R + N_S),$$

where P is the value of the parameter from the scoring model 305, $P_S$ is the average value of the parameter for all occurrences of the phoneme node in the speaker adaptation data, $N_S$ is the number of occurrences of the phoneme node in the speaker adaptation data, and R is a relevance count used to weight the speaker adaptation data relative to the training data. Though P typically represents thousands of samples, R generally has a value between five and ten.

Finally, the processor assigns a speaker identifier 320 to the adapted model 300 and stores the adapted model 300 in the set of speech models 130 (step 215).

Figure 4:
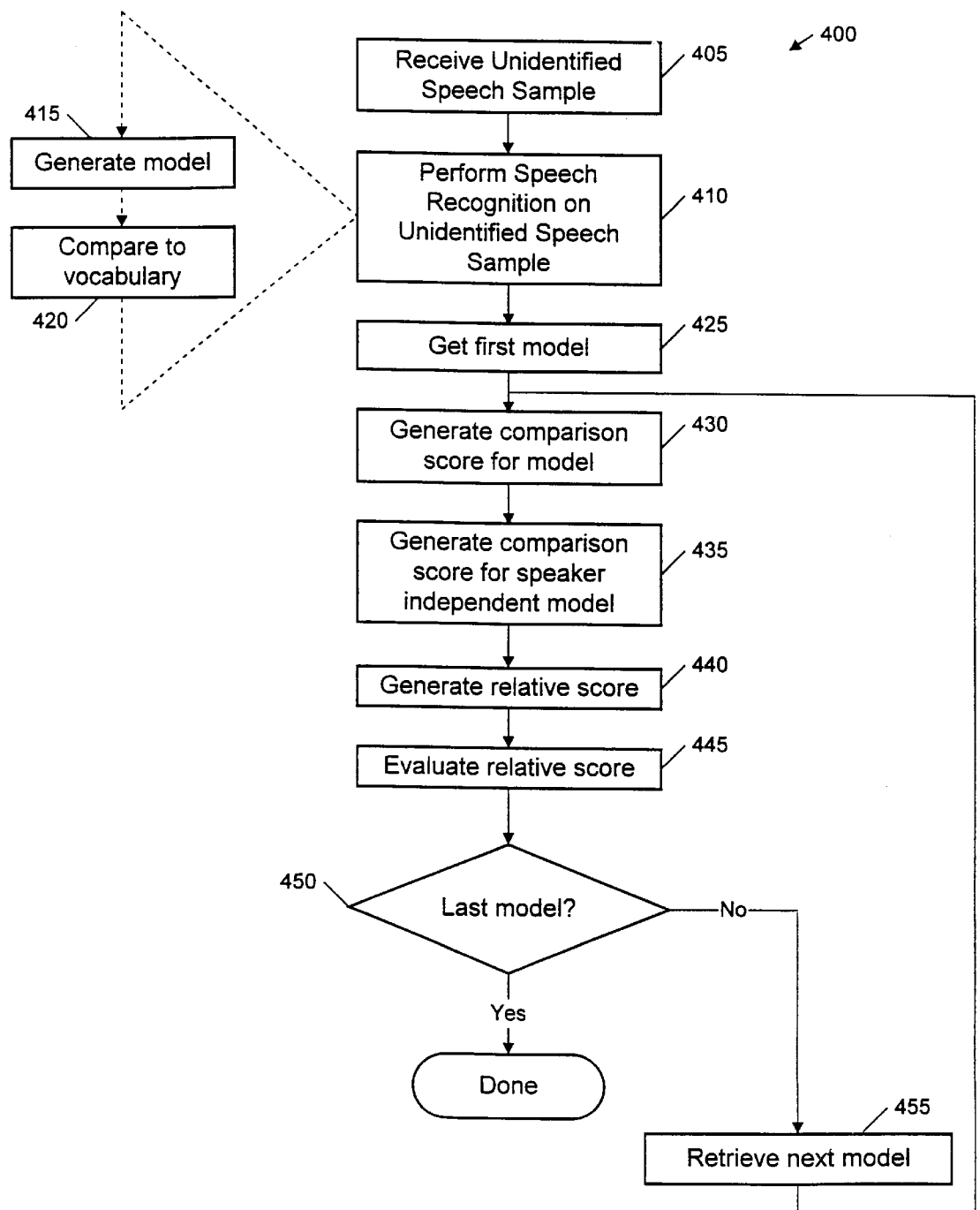
FIG. 4 is a flow chart of a procedure performed by the speaker identification system of FIG. 1.
Figure 5:
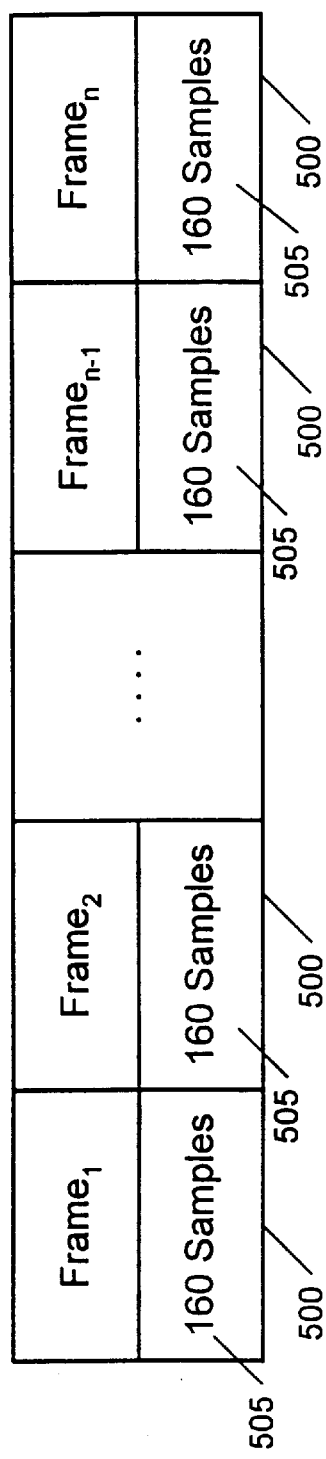

Referring to FIG. 4, the processor 105 performs speaker identification according to a procedure 400. The processor begins the procedure upon receiving an unidentified speech sample 110 (step 405). As shown in FIG. 5, the processor 105 receives the unidentified speech sample 110 as a set of digital frames 500 produced by periodically sampling an analog signal corresponding to the speech to produce a set of sample 505 for each frame. For example, if the speaker identification system 100 were incorporated into a voice messaging system, the unidentified speech sample would be generated by periodically sampling an analog telephone message to produce a digital signal. In particular, the digital signal would be produced using a frame length of 20 milliseconds and an analog-to-digital converter with a sampling rate of about 8 kHz so that the digital signal would include 160 digital samples 505 in each frame 500. The samples for each frame 500 are then converted to frequency parameters using a Fourier transform.

Next, the processor 105 performs speech recognition on the unidentified speech sample 110 (step 410). The processor performs continuous speech recognition. This means that the speaker does not need to pause between each word in the sample 110, and that the processor can recognize the words regardless of whether there are pauses between the words. A more detailed description of continuous speech recognition is provided in U.S. Pat. No. 5,202,952, entitled "Large-Vocabulary Continuous Speech Prefiltering and Processing System", which is incorporated by reference.

Figure 6:
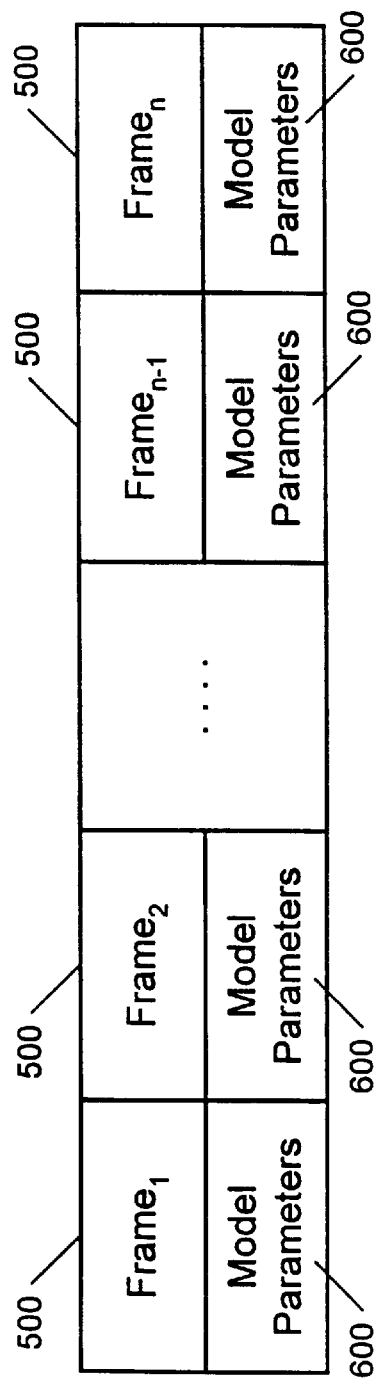

In performing speech recognition, the processor processes the sample 110 to produce a sequence of frames 115 (step 415). As shown in FIG. 6, each frame 500 of the sequence of frames 115 includes a set of parameters 600 that represent the frequency content of the frame (i.e., the energy of the frames in different frequency bands). As noted above, in one implementation, the set of parameters includes twenty four parameters selected from a set of forty four parameters (eight spectral parameters, twelve cepstral parameters, twelve cepstral differences and twelve cepstral second differences) using an IMELDA Transform. A more detailed description of how speech is received and stored within a speech recognition system is provided in U.S. Pat. No. 5,027,406, entitled "Method for Interactive Speech Recognition and Training", which is incorporated by reference.

The processor 105 identifies the words that were spoken by comparing the sequence of frames 115 to word models stored in the vocabulary 120 (step 420). As shown in FIG. 7, the vocabulary 120 includes a set of words 700. Each word 700 is represented by a set of phonemes 705 that represent the phonetic spelling of the word. Each phoneme 705 is represented by three sets of model parameters 710 that correspond to the three nodes of the phoneme. The processor identifies words in the unidentified speech sample 110 by comparing the model parameters 600 from the sequence of frames 115 to the model parameters 710 from the recognition vocabulary 120 to find series of frames 500 from the sequence of frames 115 that correspond to words 700 from the recognition vocabulary.

Figure 8:
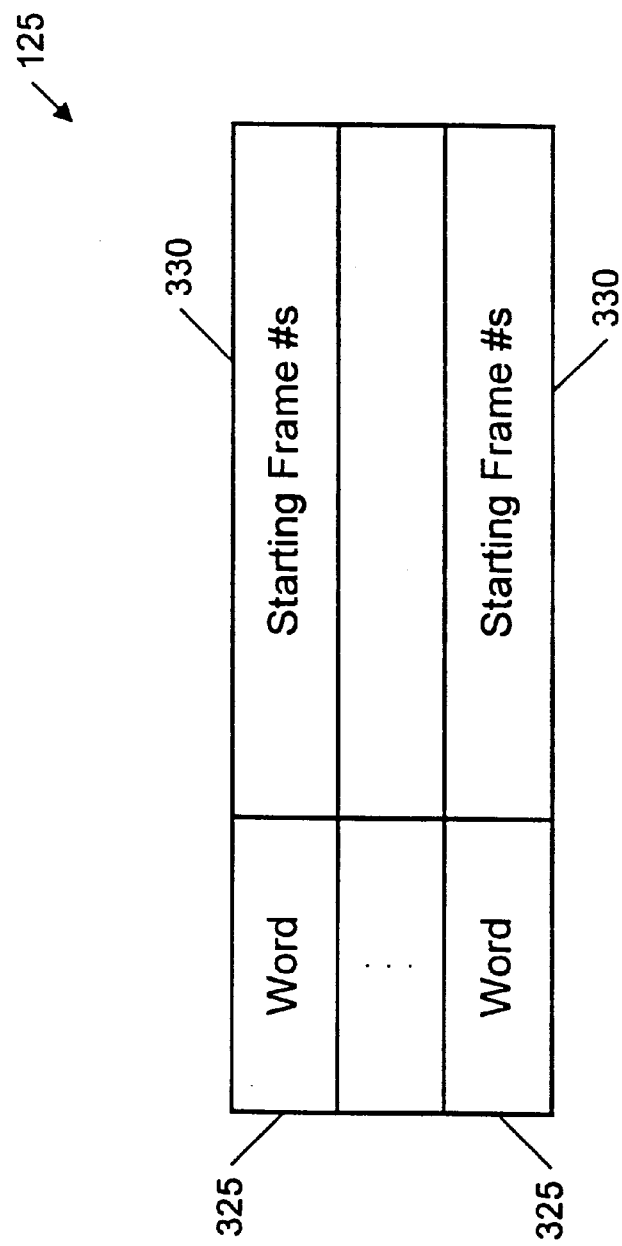

Based on the results of comparing the sequence of frames 115 to the recognition vocabulary 120, the processor produces the text 125 that corresponds to the sample 110. As shown in FIG. 8, the processor produces a time alignment of the text 125 with the sequence of frames 115 so that a phoneme node 800 is associated with each frame 500 of the sequence of frames 115. A similar result could be obtained by associating a starting frame number with each phoneme node of the text.

After performing speech recognition, the processor 105 retrieves the first model 300 from the set of speech models 130 produced by known speakers (step 425). As shown in FIG. 3 and discussed above, each model 300 from the set of speech models 130 includes a speaker identifier 320 and a set of phonemes 310. As also discussed above, each phoneme node is represented by three sets of model parameters 315 that may correspond to the way in which the speaker voices the three nodes of the phoneme.

The processor compares the retrieved model 300 to the sequence of frames 115 of the unidentified speech sample 110. First, the processor produces a comparison score for the speaker represented by the retrieved model (step 430). This score is the negative of the logarithm of the probability that the speaker represented by the retrieved model produced the speech represented by the sequence of frames 115.

The processor produces the comparison score for the retrieved model 300 by comparing each frame 500 of the sequence of frames 115 to model parameters 315 from the retrieved model for the phoneme node to which the frame corresponds (as indicated by the text 125). In particular, the processor produces a score for each frame as:

$$\text{score}_{frame} = \sum_{i=1}^{44} \frac{(f_i - p_i)^2}{\sigma_i^2},$$

where i corresponds to a particular parameter, $f_i$ is the parameter value for the frame, $p_i$ is the mean parameter value for the phoneme node, and $\theta_i$ is the deviation of the parameter value for the phoneme node. The processor then sums the scores for all of the frames to produce a score for the node. Finally, the processor sums the scores for all nodes of an utterance to produce a score for the utterance.

Next, if the processor has not already done so, the processor produces a comparison score for the unadapted version of the scoring model 305 (step 435). The processor produces the comparison score for the unadapted (speaker independent) model 305 in the same way that the processor produces the comparison score for the retrieved model 300.

The processor then determines a relative score for the speaker represented by the retrieved model by subtracting the score for the speaker independent model from the score for the retrieved model (step 440). Since the two scores are logarithmic values, the subtraction corresponds to division of the probabilities and the relative score corresponds to a likelihood ratio.

The subtraction accounts for background or other conditions that may affect the score. For example, if the speech represented by the sequence of frames 115 were received over a noisy phone line, the comparison score for the retrieved model and the comparison score for the speaker independent model would be affected similarly by the noise on the phone line. Accordingly, subtraction of the scores would eliminate or reduce the effects of the noise.

The subtraction also serves to discount the effect on the score of unadapted phoneme nodes or phoneme nodes that have only been adapted by a small number of occurrences. As discussed above, the model for a particular known speaker is produced by modifying a speaker independent model based on training data generated from speech of the known speaker. As such, a phoneme node must occur in the training data for the model of the node to differ from the corresponding model in the speaker independent model, and must occur in the training data more than a few times for the model of the node to differ substantially from the corresponding model in the speaker independent model. The comparison scores for the retrieved model and the speaker independent model will be identical for frames corresponding to unadapted phoneme nodes. Accordingly, the subtraction will result in the effect of those frames being cancelled from the relative score. Similarly, the comparison scores for the retrieved model and the speaker independent model will differ only slightly for frames corresponding to slightly adapted phoneme nodes so that the subtraction will result in the effect of those frames having a reduced effect on the relative score.

Finally, the processor evaluates the relative score to determine whether the speaker associated with the retrieved model is likely to have produced the speech corresponding to the sample 110 (step 445). In an open set identification system, there may be more than one speaker who is likely to have produced the speech corresponding to the sample 110.

In one approach to evaluating the score, the relative score is normalized to compensate for differences in the amount of adaption data available for each speaker. This normalization process produces a normalized score that then may be used to indicate the likelihood that the known speaker corresponding to the retrieved model was the speaker who produced the speech sample 110. For example, the score may be normalized using so-called Z-normalization in which a first calibration factor is subtracted from the score and the result is divided by a second calibration factor. The calibration factors may be produced by computing the scores produced using a set of utterances from a set of speakers used for calibration and designating the first calibration factor as the mean value of the scores and the second calibration factor as the standard deviation of the scores.

In a closed set identification system, the relative score may be evaluated by maintaining the score of the best-scoring model and using that score in evaluating each successive model. After the models for all known speakers are evaluated, the speaker corresponding to the model having the best score could be selected as being the speaker who produced the speech sample 110.

After evaluating the relative score, the processor determines whether the retrieved model is the last model in the set of models 130 (step 450). If not, then the processor retrieves the next model from the set of models 130 (step 455) and repeats the process of comparing that retrieved model with the sequence of frames 115 of the unidentified speech sample (steps 430–450). The processor continues this process until all of the models from the set of models 130 have been evaluated.

When the evaluation of the relative score clearly indicates that one known speaker produced the speech sample 110, the processor 105 may use the sequence of frames 115 and the text 125 of the speech sample 110 to update the speech model for the identified speaker.

Figure 9:
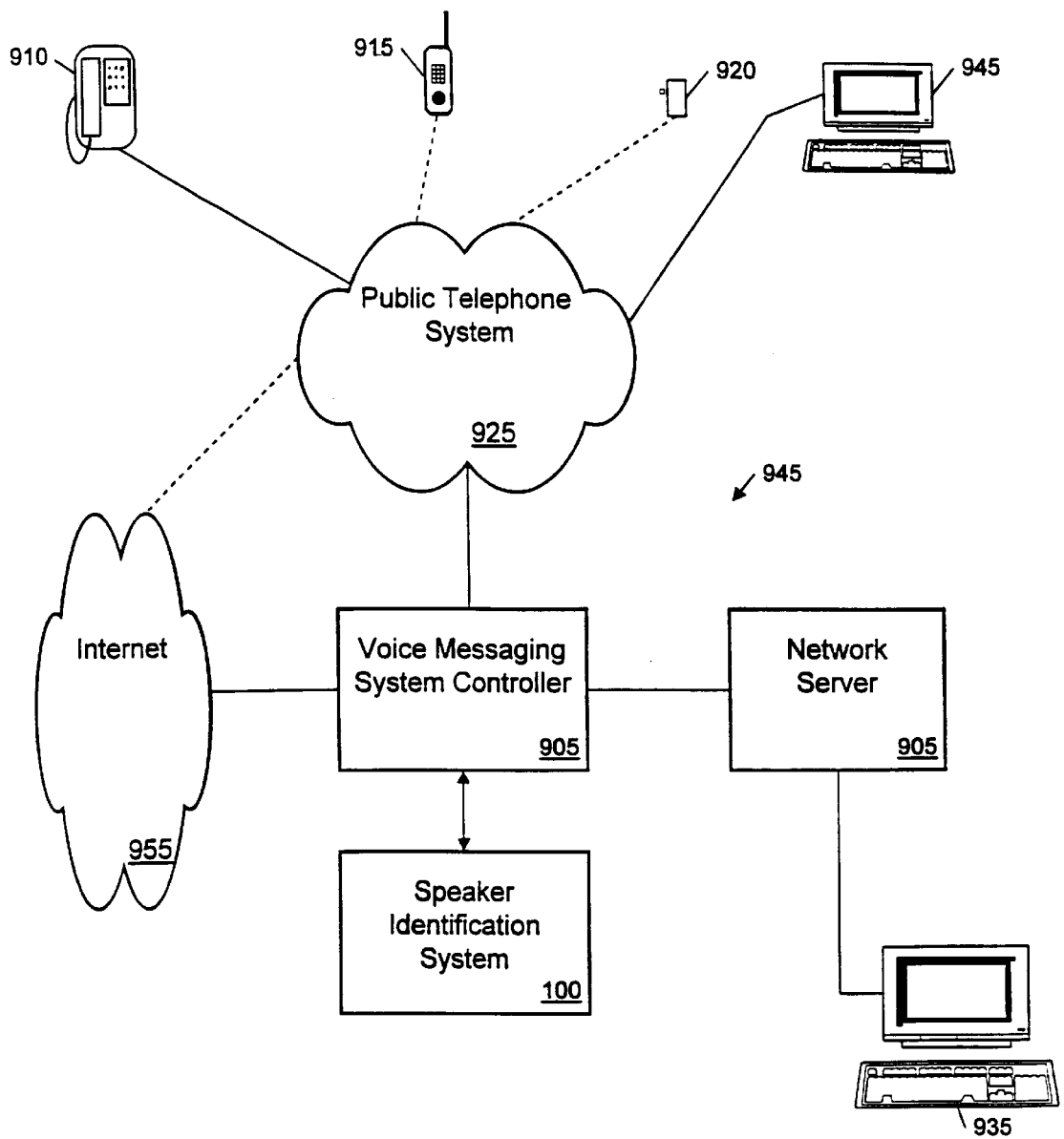
FIG. 9 is a block diagram of a voice messaging system including the speaker identification system of FIG. 1.

Referring to FIG. 9, the speaker identification system 100 may be implemented in a voice messaging system 900 to provide a user with the likely identity of a person who has left messages for the user. This identity could be used to prioritize messages based on the source of the messages, or to take other actions. For example, a user of the voice messaging system 900 could configure a controller 905 of the system to call the user's home telephone 910, portable telephone 915, pager 920 or some other telephone number when a message is received from a particular person (e.g., a supervisor or an important customer). To this end, the controller 905 is connected to the public telephone network 925 through a suitable telephone connection 930.

The user also could configure the controller to send an electronic mail message to the user's office computer 935 through a network server 940, or to the user's home computer 945 through the telephone connection 930 or a connection 950 to the Internet 955. The electronic mail message would notify the user that a message has been received, identify the source of the message, and, in some instances, provide the text of the message or an audio file including the message itself.

Upon reviewing a message, the user could indicate to the system whether the system correctly identified the speaker. If the system did not correctly identify the speaker, or if the system was unable to identify the speaker who produced a particular message, the user could provide the system with the identity of the speaker after reviewing the message. The system could then adapt a speech model for the speaker based on the contents of the message. This provides the voice messaging system with the ability to adapt so that the system's ability to identify speakers will improve with time.

The speaker identification system 100 also may be used to identify the user of a speech recognition system. The performance of a speech recognition system may be improved by using speaker-dependent speech models. In some applications, such as, for example, medical transcription systems, a speech recognition system may be used by a variety of different speakers. Care must be taken to ensure that a user has been identified properly so that an appropriate model is used.

The speaker identification system 100 may be used to permit a user to use the speech recognition system without first providing his or her identity. In one implementation, a speaker-independent speech model would be employed when a user begins to use the speech recognition system and the speaker identification system would be run as a background process. Upon determining the identity of the user, the speaker identification system would instruct the speech recognition system to switch to an appropriate speaker-dependent speech model. If desired, the speech recognition system could indicate to the user that the user has been identified and permit the user to correct any identification error.

Other embodiments are within the scope of the following claims.

What is claimed is:

1. A method of producing a speech model associated with a speaker for use in determining whether the speaker produced an unidentified speech sample, the method comprising:

obtaining a sample of speech of the speaker; and producing a speech model for subsequent use associated with the speaker by:

identifying words in the sample of speech using speech recognition, and deriving a new speech model using the sample of speech and the identified words, the speech model being derived without verifying the accuracy of the identified words and without controlling the content of the sample of speech.

2. The method of claim 1, wherein:

identifying the words comprises associating time segments of the sample of speech with corresponding sounds; and deriving the speech model comprises causing the model to represent how the speaker produces sounds based on the associated time segments of the sample of speech.

3. The method of claim 2, wherein producing a speech model further comprises:

providing an unadapted speech model based on speech of a collection of speakers; and adapting the unadapted speech model based on the speech sample.

4. The method of claim 3, wherein adapting the unadapted speech model comprises adapting portions of the unadapted speech model related to sounds included in the speech sample based on the corresponding time segments of the speech sample.

5. The method of claim 3, wherein adapting the unadapted speech model comprises adapting the unadapted speech model based on the identified words of the speech sample.

6. The method of claim 4, wherein the unadapted speech model comprises a monophone model.

7. The method of claim 6, wherein identifying the words comprises using a speech recognition vocabulary that includes triphone models.

8. The method of claim 5, wherein the unadapted speech model comprises a triphone model.

9. The method of claim 5, wherein the unadapted speech model represents phonemes.

10. The method of claim 9, wherein the unadapted speech model represents each phoneme as a sequence of nodes.

11. The method of claim 10, wherein the unadapted speech model represents each phoneme as a sequence of three nodes.

12. The method of claim 10, wherein the unadapted speech model represents each phoneme node using a collection of parameters that represent the frequency content of the node.

13. The method of claim 5, wherein adapting the unadapted speech model based on the sample of speech and the identified words comprises using a Bayesian adaptation approach.

14. The method of claim 1, wherein the speaker comprises a particular speaker, the method further comprising using a sample of speech of a second, unidentified speaker and the speech model of the particular speaker to determine if the particular speaker is likely to be the unidentified speaker.

15. The method of claim 1, wherein the speaker comprises a particular speaker, the method further comprising:

obtaining a second sample of speech from an unidentified speaker; and comparing the second sample of speech to the speech model for the particular speaker to determine whether the particular speaker is likely to be the unidentified speaker.

16. The method of claim 15, wherein comparing the second sample of speech to the speech model for the particular speaker comprises generating a comparison score for the speech model based on the comparison.

17. The method of claim 16, further comprising comparing the second sample of speech to an unadapted speech model based on speech of a collection of speakers and generating a comparison score for the unadapted speech model.

18. The method of claim 17, further comprising generating a relative comparison score based on the difference between the comparison score for the speech model for the particular speaker and the comparison score for the unadapted speech model.

19. The method of claim 15, further comprising modifying the speech model using the second sample of speech.

20. The method of claim 15, further comprising modifying the speech model using the second sample of speech when the particular speaker is likely to be the unidentified speaker.

21. The method of claim 1, further comprising obtaining the sample of speech from a voice messaging system.

22. A method of identifying a speaker who produced an unidentified speech sample, comprising:

producing speech models for known speakers, wherein a speech model for each known speaker is produced by:

obtaining a sample of speech of the known speaker, identifying words in the sample of speech of the known speaker using speech recognition, and deriving the speech model using the sample of speech and the identified words without verifying the accuracy of the identified words and without controlling the content of the sample of speech;

obtaining a sample of speech from an unidentified speaker;

identifying words in the sample of speech from the unidentified speaker; and comparing, based on the identified words, the sample of speech from the unidentified speaker to the speech models for the known speakers to determine whether a known speaker is likely to be the unidentified speaker.

23. The method of claim 22, further comprising indicating that none of the known speakers is likely to be the unidentified speaker when none of the speech models for the known speakers matches the sample of speech for the unidentified speaker to within a predetermined threshold.

24. The method of claim 22, further comprising identifying the unidentified speaker as the known speaker corresponding to the speech model that most closely matches the sample of speech for the unidentified speaker.

25. The method of claim 22, wherein the step of producing a speech model further comprises:

provinding an unadapted speech model based on speech of a collection of speakers; and adapting the unadapted speech model based on the speech sample for the known speaker.

26. A method of processing voice messages in a voice messaging system, comprising:

receiving a first voice message;

using speech recognition to identify words in the first voice message without controlling the content of the first voice message;

deriving a speech model for the speaker of the first voice message using the identified words; and using the derived speech model to determine if the speaker of the first voice message is the speaker of a second voice message.

27. The method of claim 26, wherein receiving a voice message comprises receiving a voice message transmitted via a telephone line.

28. The method of claim 26, wherein the speaker does not receive an indication that a voice message will be processed to identify the speaker.

29. The method of claim 26, further comprising receiving identification of the speaker of the first voice message from a listener of the first voice message.

* * * * *